United States Patent [19]

Taylor et al.

[11] Patent Number: 5,720,911

[45] Date of Patent: Feb. 24, 1998

[54] SINTERED BORON CARBIDE ARTICLES

[75] Inventors: Richard N.J. Taylor; Jonathan Crane; Roy Fletcher; Michael Fry; John H. Sant, all of Reading, Great Britain

[73] Assignee: The Secretary of State for Defence in Her Britannic Majesty's Government of the United Kingdom of Great Britain and Northern Ireland, London, United Kingdom

[21] Appl. No.: 776,879

[22] PCT Filed: Aug. 29, 1995

[86] PCT No.: PCT/GB95/02029

§ 371 Date: Feb. 12, 1997

§ 102(e) Date: Feb. 12, 1997

[87] PCT Pub. No.: WO96/09265

PCT Pub. Date: Mar. 28, 1996

[30] Foreign Application Priority Data

Sep. 19, 1994 [GB] United Kingdom ............ 9418817

[51] Int. Cl.$^6$ ........................................ C01B 31/36
[52] U.S. Cl. ................. 264/29.1; 264/29.7; 264/670; 264/671
[58] Field of Search ........................ 264/29.1, 29.7, 264/670, 671

[56] References Cited

U.S. PATENT DOCUMENTS

| | | | |
|---|---|---|---|
| 4,005,235 | 1/1977 | Prochazka | 428/36 |
| 4,195,066 | 3/1980 | Schwetz | 264/332 |

FOREIGN PATENT DOCUMENTS

| | | |
|---|---|---|
| 0336733 | 10/1989 | European Pat. Off. . |
| 2014193 | 8/1979 | United Kingdom . |

OTHER PUBLICATIONS

Ceramic Engineering And Science Proceedings, vol. 6, No. 7/8, Columbus, Ohio, USA, pp. 1151–160, Dole et al, Densification and Microstructure Development in Boron Carbide, 1985.

*Primary Examiner*—James Derrington
*Attorney, Agent, or Firm*—Nixon & Vanderhye P.C.

[57] ABSTRACT

A method of making a boron carbide article by sintering includes mixing boron carbide with an epoxidized resin in solution and drying to form a granulated homogenized mixture and a carbonization cycle in which the mixture is maintained at at least two constant temperatures for predetermined times. The rates of temperature rise are at controlled rates sufficient to allow outgassing of the gases evolved during the decomposition of the resin.

8 Claims, 3 Drawing Sheets

SINTERED BORON CARBIDE ARTICLES

The present invention relates to Boron Carbide articles and in particular to a method capable of producing such articles weighing several kilograms (kg)

BACKGROUND OF THE INVENTION

Boron Carbide is an extremely hard substance, with a hardness exceeded only by diamond and cubic boron nitride. It has, therefore, many uses. However it has hitherto proved difficult to utilise the full potential of the material as a result of the difficulties met in manufacturing shaped articles.

Of the known prior art methods of forming articles from boron carbide:

pressure sintering requires very high pressures requiring expensive equipment, and has proved practical for the manufacture of only small articles of simple geometrical shape:

pressureless sintering, (as described in "Bericht uber Untersuchung der Gestzmassigkein bei Erzeugung des Hochdicen Borcarbids durch Sinterung", by P S Kislyi and B L Grabtschuk. 4th European Powder Metallurgy Symposium (Grenoble, France) 1975, INIS-mf-2082; Chemical Abstracts 87 (1977) 140 112) requires sintering in the immediate premelt zone at about 2300° C. Very accurate temperature control, which is very difficult in this region, is necessary as any incursion into the melting zone results in unacceptable glazing of the final product. A further disadvantage of this method is the fact that the finished articles have a strength 15 to 20% lower than that of similar hot-pressed articles; and pressureless sintering with a mixture of beryllium carbide (U.S. Pat. No. 4,005,235) requires the use of a very toxic material and results in a product which contains impurities which precludes its use in the nuclear industry, where boron carbide articles have uses as neutron absorbers.

Recent advances in boron carbide technology, as described in U.S. Pat. No. 4,195,066 and GB-A-2,014,193, involve sintering boron carbide particles mixed with amorphous carbon or with a material which yields carbon when heated. In a typical process, as described in U.S. Pat. No. 4,195,066, boron carbide having a B:C atomic ratio within the range 4.5:1 to 3.5:1 and a particle size not exceeding 1 μm is formed into a homogeneous mixture with amorphous carbon, or with an organic material which can be coked to form amorphous carbon at a temperature not exceeding 1000° C., in an amount corresponding to 0.5 to 10% by weight carbon. The mixture (optionally also including a solvent) is molded and shaped into a green body having a density of at least 50% of the theoretical density (TD) of the boron carbide, any solvent involved and not being lost during this process then being removed, and the mixture is then sintered in an atmosphere inert to boron carbide at a temperature within a range of 2100° to 2200° C. Examples given in this U.S. Patent show that much higher percentage TDs were obtained when sintering with carbon than without.

GB-A-2,014,193 uses a similar method, sintering at 2390° C., and gives examples where TDs of 98.5% and 98% were achieved.

The articles produced in the examples of U.S. Pat. No. 4,195,066 were 40 mm long and 8 mm wide and typically weighed of the order of 100 g, whilst the size of the examples in GB-A-2014.066 was not specified.

It has been found in practice that the use of the above mentioned boron carbide/carbon mixture processes for large articles, such as articles suitable for use in body armour, is not easy.

SUMMARY OF THE INVENTION

According to the present invention a method of making a boron carbide article by sintering includes the steps of mixing boron carbide particles with an epoxidised resin dissolved in a carrier solvent to form an homogenised mixture; drying the mixture; granulating the dried mixture; forming the granules into a required shape; and sintering at a temperature of between 2230° C. and 2295° C. the sintering step being preceded by a carbonisation cycle wherein the formed shape is maintained at constant temperatures for predetermined times, there being at least two temperatures, rates of temperature rise being at controlled rates.

The method may be carried out continuously in a sintering furnace. However, some sintering furnaces do not have extraction systems capable of dealing with the decomposition gases produced in the carbonisation cycle, and when such a furnace is to be used the carbonised article may be cooled before the sintering step.

The number of temperatures, the dwell times at these temperature and the rates of temperature rise (and of cooling, if this is required) will largely depend on the dimensions of the article to be produced and the epoxidised resin used and may be determined empirically. for example by monitoring the temperatures at which and amounts of gases evolved from a test article of substantially the same dimensions and composition as the articles to be produced.

U.S. Pat. No. 4,195,066 does mention the optional use of a prefiring step" carried out in an inert atmosphere within the range 100° C. and 15000° C., the purpose of this step being to strengthen the green body (the basic material in condition for sintering) prior to a machining operation but makes no mention of controlling the rates of temperature changes to control outgassing.

The boron carbide particles preferably have a specific area of 7.5 to 12 m²/g and a median particle size of 1.5 to 3.5 μm with at least 95% of the mass being less than 12.7 μm. The material should more than 99.3% pure excluding oxide and nitride, or more than 97% pure including oxide and nitride. The boron to carbon atomic ratio preferably lies in the region of 3.78:1 to 4.33:1.

The carbon forming resin may be a semi-solid epoxidised phenol novolac resin with an epoxide equivalent between 175 and 182 and a chlorohydrin value less than 0.25. This provides a resin with a moderate carbon yield, allowing more to be added to the mixture thereby providing an article with a larger green body strength (as more binder is present). The resin may be added to the boron carbide powder in the ratio boron carbide:resin 88:12 by mass, with an organic carrier solvent such as, for example, dichloromethane or a mixture including methanol.

The sintering temperature should be in the range 2230° C. to 2280° C., but not above 2295° C.

BRIEF DESCRIPTION OF THE DRAWINGS

The invention will now be described, by way of example only, with reference to the accompanying diagrammatic drawings, of which

DETAILED DESCRIPTION OF THE DRAWINGS

Figure 1:
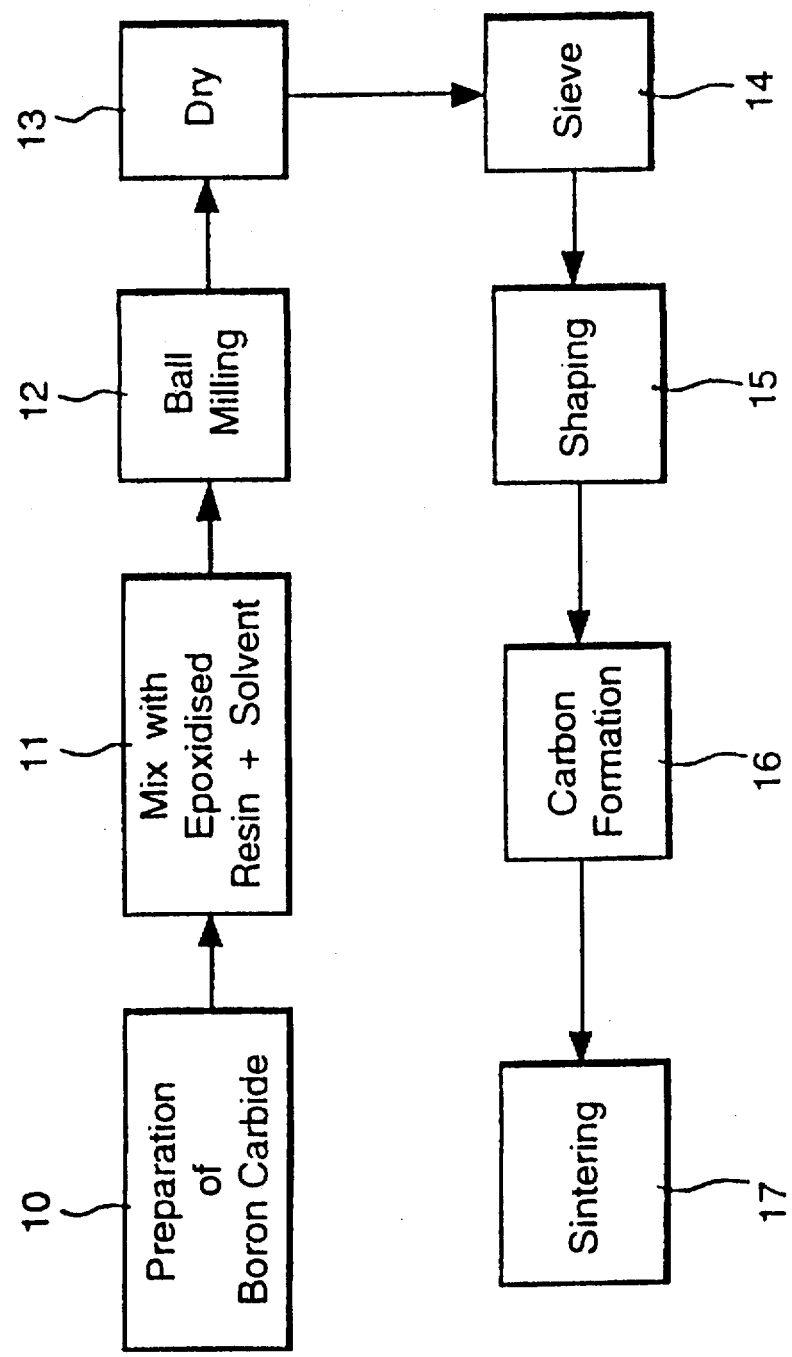
FIG. 1 is a flow chart of the method of the invention.
Figure 2:
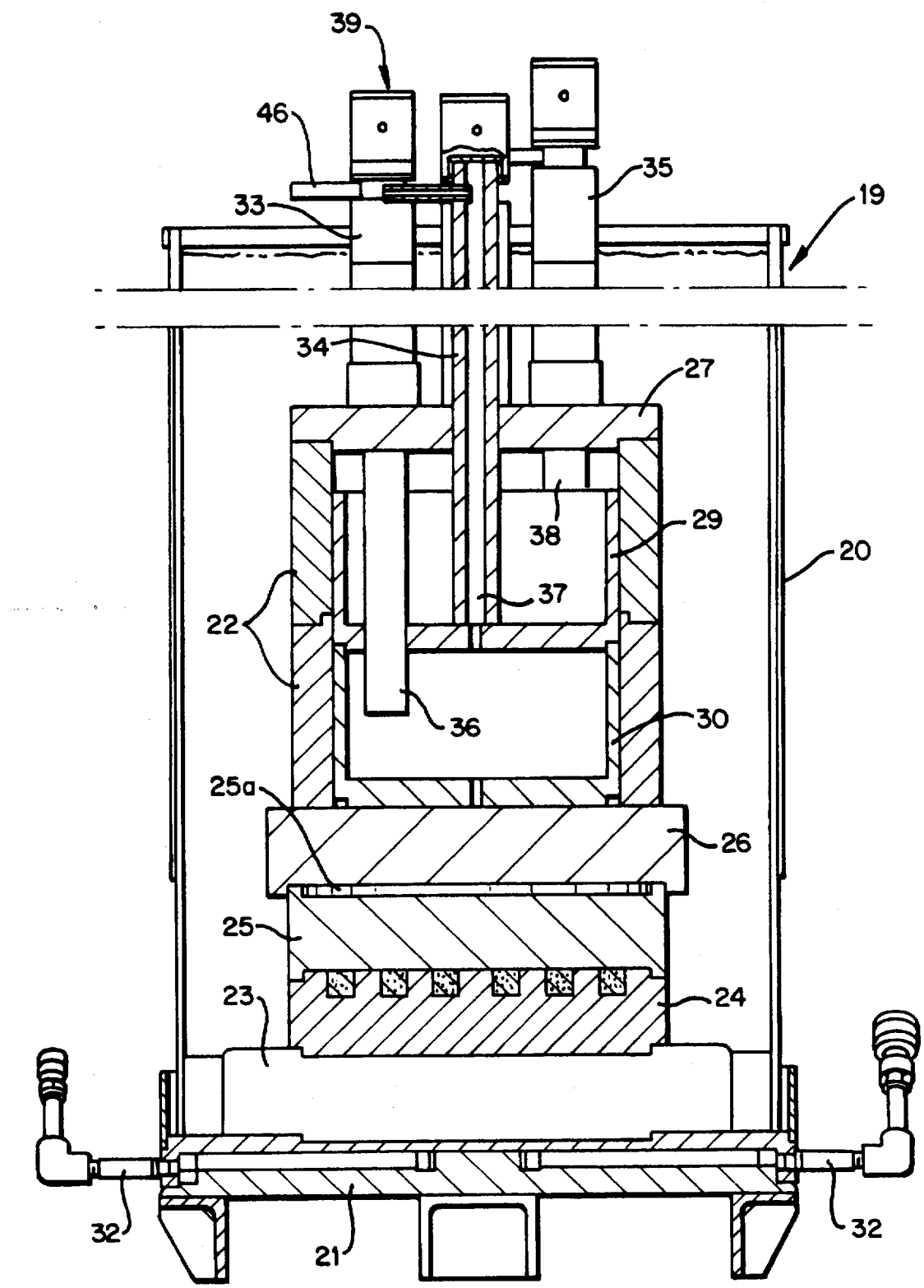
FIG. 2 is an elevation, in section along line Z—Z of FIG. 3, of a furnace for use with the method of the invention.

A method for preparing boron carbide articles by the method of the present invention (FIG. 1) starts with the preparation 10, by means well known in the art, of a quantity of boron carbide having a specific surface area within the range 7.5 to 12.0 m$^2$/g, a median particle size within the range 1.5 to 3.5 µm, with 95% by mass having a particle size less than 12.7 µm, a purity greater than 99.3%, excluding the oxide or nitride present or greater than 97% including the oxide or nitride, and an atomic ratio boron (B) to carbon (C) in the range 3.78:1 to 4.33:1.

The boron carbide is then mixed 11 with a semi-solid epoxidised phenol novolac resin (such as, for example, Ciba Geigy GY1180) in the ratio 88:12 by mass, and with a carrier solvent (usually dichloromethane). A quantity of methanol may also be added at this stage as this has been found to help in preventing the formation of a thixotropic fluid (possibly due to its interaction with surface oxide which changes the chemistry of the particle/solvent interface).

The mixture from 11 is next 12 submitted to a ball milling operation and the resultant homogeneous mixture, which is in the form of a slurry, is allowed to dry in air 13 until it forms a friable cake which is granulated 14 by pushing through a nylon sieve having, preferably, a 1 mm mesh. The result is an intimate mix of free flowing granules having about 12% by weight resin.

The mixture is then formed into a required shape 15 using a method appropriate to the size of the article being produced. For large or complex shapes wet bag isostatic pressing can be used, accompanied, particularly where powder bridging is likely to occur because of the geometry of the shape, by use of a vibratory table to ensure that no large voids are formed within the powder charge in the isostatic press mould. Whilst handleable pressed (green) articles are produced with pressures of 1,000 p.s.i. upwards, 10,000 p.s.i. is required for maximum sintered density, and pressures of 16,000 to 18,000 p.s.i. are commonly used.

The green article is then heat treated 16 in an inert atmosphere (for example argon) in order to change the resin to carbon. This heat treatment must be applied in a controlled manner to prevent any cracking or spalling caused by the generation of gases from the breakdown or the resin. The operation must be carried out in a suitable furnace with an extraction system capable of handling the exhaust gases. This heat treatment, here referred to as carbonisation, consists of soaks at at least two substantially constant temperatures followed by cooling, rates of temperature rise and of cooling being controlled.

Details of the "carbonisation" cycle depend on the maximum thickness present in the article. For thicknesses less than 45 mm, a typical cycle is as follows:

heat from ambient to 200° C.$^+$_50° C. at 180° C.$^+$_50° C./hr:

hold for at least 30 minutes:

raise to 600° C.$_+$_50° C. at 60° C.$^+$_30° C. /hr:

hold for at least 60 minutes:

cool to below 200° C.

For preforms with any section of thickness of 45 mm or more a typical cycle might be:

heat from ambient to 200° C.$^+$_50° C. in 8 hours:

hold for at least 30 minutes (usually overnight):

raise to 450° C.$^+$_50° C. in 8 hours:

hold for at least 30 minutes (usually overnight): raise to 650° C.$^+$_50° C. in 8 hours:

hold for at least 30 minutes (usually overnight):

cool to ambient.

The rates of temperature increase should be kept as low as is feasible. This allows the resin decomposition to take place gradually and the gases to percolate out of the preform. Following the dwell, cooling is allowed to occur naturally in an inert atmosphere. The carbonised preforms should be handled carefully because the amount of binder present has now been substantially reduced.

Finally the preform is placed in a furnace and sintered 17, with careful control of temperature rate rises and dwell times. As with the carbonisation cycle programs this is carried out in an inert atmosphere, such as, for example, argon.

For preforms which underwent the shorter of the above described carbonisation cycle programs a typical sintering program might be:

heat from ambient to 1000° C.$^+$_20° C. at less than 800° C. per hour:

heat from 1000° C. to 1600° C.$^+$_20° C. at less than 500° C. per hour:

heat from 1600° C. to between 2230° C.$^+$_5° C. and 2280° C.$^+$_5° C. at less than 200° C. per hour: and hold at between 2230° C.$^+$_5° C. and 2280° C.$^+$_5° C. for 15 to 120 minutes.

For an article which underwent the longer of the above described carbonisation cycle programs a typical sintering program might be:

heat from ambient to 1000° C.$^+$_20° C. at less than 300° C. per hour:

heat from 1000° C.$^+$_20° C. to 1600° C.$^+$_20° C. at less than 250° C. per hour:

heat from 1600° C.$^+$_20° C. to between 2230° C.$^+$_5° C. and 2280° C.$^+$_5° C. at less than 150° C. per hour, and:

Hold at between 2230° C.$^+$_5° C. and 2280° C.$^+$_5° C. for 120$^+$_10 minutes.

It is important that at no time during the sintering process should the maximum temperature recorded exceed 2295° C.

The dwell will be 2280° C.$^+$_5° C. when a large article is being sintered. The lower temperatures and shorter dwell times are only applicable to small items made from specific powder batches. Following the dwell, cooling is allowed to occur naturally whilst still in an inert atmosphere.

As mentioned above accurate control of temperatures at the levels required by this method, especially during the final sintering process, is extremely difficult. It can, however, be crucial to the quality of the final product.

A graphite induction furnace 19 suitable for the sintering process of the present method (FIGS. 2 to 7) has a casing 20 surrounded by an induction coil (not shown). The casing 20 is supported by a water cooled baseplate 21 having water supply and disposal pipes 32. Mounted on the base plate 21 is an assembly having a bottom plate 23 and a series of graphite discs 24, 25 and 26 with any spaces therebetween filled with carbon black. The lowest disc 24 has concentric rings in the top face filled with carbon black. Disc 25 has pieces of pyrolitic graphite recessed into a top face 25a. Mounted on the top disc 26 is a graphite susceptor 22, the space between the susceptor 22 and casing 20 being filled with carbon black insulation. At the top of the susceptor 22 is a graphite lid 27, and within the space bounded by the top of the disc 26, the susceptor 22 and the lid 27 are upper and lower sintering pots 29, 30 respectively, both pots 29, 30 being removable.

Figure 3:
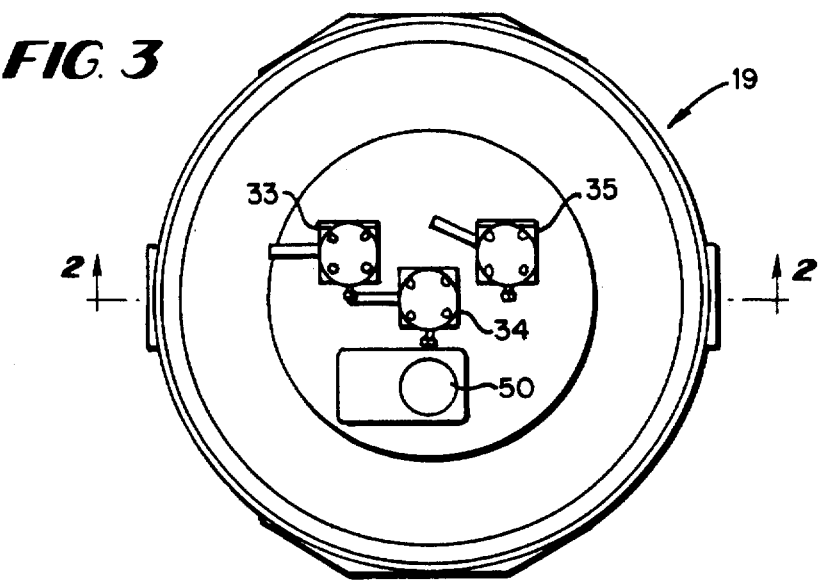
FIG. 3 is a plan view of the furnace shown in FIG. 2.

Passing through the lid 27 are three graphite sight tubes 33, 34, 35 (FIGS. 4, 5) and a vent tube 50 (FIG. 3). The three sight tubes terminate at different points 36, 37, 38 within the furnace, dependant on the shape and size of an article to be sintered.

Figure 4:
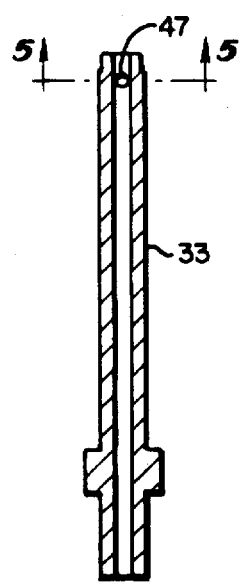
FIG. 4 is an elevation, in section along line X—X of FIG. 5, of a sight tube used in the furnace.
Figure 5:
FIG. 5 is a plan view, in section along line Y—Y of FIG. 4, of the sight tube.
Figure 6:
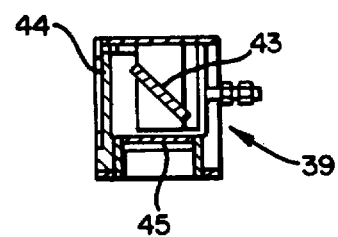
FIG. 6 is an elevation, in Section along line A—A of FIG. 7, of a viewing head used with the sight tube.
Figure 7:
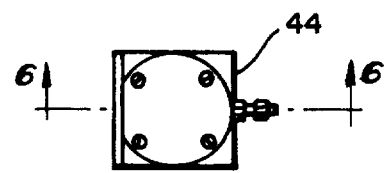
FIG. 7 is a plan view of the viewing head.

At the top of each sight tube 33, 34, 35 is a head assembly 39 (FIGS. 6, 7) which is screwed onto the sight tube. Each head assembly consists of an aluminium head 44 with a silica window 45 and a gold coated mirror 43 angled to direct light from the window 45 horizontally out of the head 44. Each sight tube has its interior connected to an argon gas supply tube 46 (FIG. 2) by means of an aperture 47 (FIG. 4).

All the graphite parts of the furnace are heat treated at a temperature in excess of 2250° C. in order to remove any volatile impurities which could contaminate parts being sintered.

An article to be sintered is placed in one of the sintering pots 29, 30. In some cases it might be necessary to locate an article on graphite blocks (for example three) to minimise contact between the pot and the article. The furnace 19 is purged with argon, introduced from supply tubes 46 through the sight tubes 33, 34, 35 and exhausted through the vent tube 50, and power is fed into the induction coils according to a required cycle, a flow of argon being maintained during the process. Temperatures are monitored via the sight tubes 33, 34 and 35, which are positioned as adjacent as possible to the article, using an infra-red pyrometer. Since the sight tube 33, 34, 35 arrangement simulates as near as possible a black body the emissivity is effectively 1.0.

Temperature measurements are taken at regular intervals using a high quality pyrometer calibrated to the highest possible standard (for example a Land "C52" model calibrated using a secondary standard lamp as supplied by the National Physical Laboratory, UK). Measurements are taken at each sight tube location, for example at intervals of approximately 15 minutes until the dwell temperature is being approached, when more frequent readings will usually be required.

It has been found that the above described method can be used to produce large shapes weighing typically between 1 to 10 Kg of high density, for example greater than 94% (that is, greater than 2.35 g/cm$^3$).

It will be realised that many variations of the above described method are possible within the scope of the invention. For example, the carbon providing material might be an epoxide equivalent of the phenol novolac resin as used in the carbonisation cycles described above or an additional step of machining the green body to a required shape may be included before any heat treatment 16 of the green body.

Also the furnace 19 described above does not have an extract system capable of handling the exhaust gases during the carbonisation cycle 16. Using a furnace with a suitable extract system would allow the cooling step in the above described carbonisation cycle programs to be dispensed with, the completion of a carbonisation cycle programs then being followed immediately by the sintering process.

To ensure that there is no contamination, polythene bottles and cylinders made of boron carbide are preferably used in the ball milling operation.

Mesh sizes other than 1 mm have been used in the granulating process, but it has been found that smaller meshes tend to give more dust and it is harder to push the dried slurry through, whilst larger meshes can give rise to an excessive amount of entrapped pores.

With respect to the furnace, modifications to the configuration of the graphite furniture, including the location of the sight tubes, the method of loading the component, and the temperature schedule may all be necessary depending upon the size and shape of the component to be sintered. It must be ensured that the rate of temperature increase shall be such as to prevent fracture of components from thermal gradients resulting in stresses arising either from differential thermal expansion or from different shrinkage rates within the component. Each article will shrink by 8–16% depending on the starting powder.

With respect to the argon supply, an increased argon flow rate can increase the removal of impurities from both the furnace and the article being sintered.

We claim:

1. A method of making a boron carbide article by sintering including the steps of
   (1) mixing boron carbide particles with an epoxidized resin dissolved in a carrier solvent to form a homogenized mixture;
   (2) drying the mixture;
   (3) granulating the dried mixture;
   (4) forming the granules into a required shape; and
   (5) sintering at a temperature of between 2,230° C. and 2,295° C. wherein the sintering step is preceded by a carbonization cycle wherein the formed shape is maintained at at least two constant temperatures for predetermined times and the rates of temperature rise are at controlled rates.

2. A method as claimed in claim 1 wherein the boron carbide particles have a specific area of 7.5 to 12 m$^2$/g.

3. A method as claimed in claim 1 wherein the boron carbide particles have a median particle size of 1.5 to 3.5 μm with at least 95% of the particles being less than 12.7 μm.

4. A method as claimed in claim 1 wherein the resin is a semi-solid epoxidized phenol novolac resin with an epoxide equivalent between 175 and 182 and a chlorohydrin value less than 0.25.

5. A method as claimed in claim 1 wherein the epoxidized resin is added to the boron carbide particles in a ratio boron carbide:resin 88:12 by weight.

6. A method as claimed in claim 1 wherein the carrier solvent is a mixture including methanol.

7. A method as claimed in claim 1 carried out in a high temperature furnace including;
   a casing surrounded by an induction coil;
   a susceptor supported by an assembly having a bottom plate on which is mounted a series of discs, the space bounded by the discs and the bottom plate being filled with high purity carbon black;
   the top of the susceptor being closed by a graphite lid;
   the space bounded by the topmost disc, the susceptor and the lid containing at least one sintering pot; and
   the lid having projecting therethrough a plurality of sight tubes which terminate at different points adjacent to the article;
   each sight tube being formed from high quality graphite and having a bore and a head mirror assembly.

8. A method as claimed in claim 7 wherein the head mirror assembly has a silica window through which light from the sight tube is directed to a gold plated mirror.

* * * * *